US006199059B1

United States Patent
Dahan et al.

(10) Patent No.: US 6,199,059 B1
(45) Date of Patent: Mar. 6, 2001

(54) SYSTEM AND METHOD FOR CLASSIFYING AND RETRIEVING INFORMATION WITH VIRTUAL OBJECT HIERARCHY

(75) Inventors: Haim E. Dahan, Dunwoody; Michael Jeffrey Galvin, Tyrone, both of GA (US)

(73) Assignee: International Computex, Inc., Atlanta, GA (US)

( * ) Notice: Subject to any disclaimer, the term of this patent is extended or adjusted under 35 U.S.C. 154(b) by 0 days.

(21) Appl. No.: 09/063,680

(22) Filed: Apr. 22, 1998

(51) Int. Cl.[7] ............................................. G06F 17/30
(52) U.S. Cl. ............................. 707/3; 707/4; 707/102; 707/103
(58) Field of Search ............................. 707/3, 4, 103, 707/102

(56) References Cited

U.S. PATENT DOCUMENTS

| | | | | |
|---|---|---|---|---|
| 5,361,349 | * | 11/1994 | Sugita et al. | 707/8 |
| 5,465,362 | * | 11/1995 | Orton et al. | 709/107 |
| 5,581,765 | * | 12/1996 | Monroe et al. | 707/103 |
| 5,588,104 | * | 12/1996 | Lanier et al. | 395/326 |
| 5,603,019 | * | 2/1997 | Kish | 707/205 |
| 5,649,139 | * | 7/1997 | Weinreb et al. | 707/103 |
| 5,794,232 | * | 8/1998 | Mahlum et al. | 707/3 |
| 5,802,296 | * | 9/1998 | Morse et al. | 709/208 |
| 5,991,763 | * | 11/1999 | Long et al. | 707/101 |

* cited by examiner

Primary Examiner—Jean R. Homere
(74) Attorney, Agent, or Firm—Finnegan, Henderson, Farabow, Garrett & Dunner, L.L.P.

(57) ABSTRACT

Three-tier virtual classification model including search schemas, virtual object hierarchy, and databases to find existing components. A virtual object hierarchy is created with objects corresponding to different categories such as electrical or mechanical components. Each object category also has a plurality of associated categories such as a bolt or resistor. Each category has associated attributes such as length, width, cost, and color. Attributes are linked to tables columns in target databases. Search schemas are created by selecting objects and attributes from the object hierarchy. The search is carried out by accessing the database columns linked to the objects and attributes in the search schemas.

2 Claims, 16 Drawing Sheets

FIG. 13

SYSTEM AND METHOD FOR CLASSIFYING AND RETRIEVING INFORMATION WITH VIRTUAL OBJECT HIERARCHY

BACKGROUND OF THE INVENTION

1. Field of the Invention

The present invention relates to a component and supplier management (CSM) system. More particularly, the present invention relates to a CSM system that uses a three-tier classification model having search schema, a virtual object, and databases. Search schema is interfaced to the databases via virtual object hierarchies to search for components with designated attributes.

2. Description of the Related Art

Companies are constantly producing new and modified products. A large factor in the profitability of a product is the time it takes to complete and market the new product. Most companies have many different components existing at the company that were designed for a different product and are in stock and ready for use. Companies can speed a product's time to market, reduce development costs, and reduce manufacturing costs by reusing these already existing company resources. By utilizing existing information, parts, components, design drawings, documents, processes, statistical information, as well as resources outside the company such as databases of parts suppliers and the like, one can significantly shorten design and production cycles and development costs.

Typically, companies are spread out over the world and include many different sites with different databases listing the components available at that site and outside resources have different databases. Most of the databases organize components by part number, and information is retrievable using only this key. In addition, different databases each require different search schema defined for the particular database. When performing a search with one schema you may not be able to find a part even though it exists in one of the databases. Therefore this search technique is not accurate. The prior art two-tier search model includes search schema defined or hard-wired for a single database instance.

FIG. 1 shows a prior art system that has a two-tier classification system. The two-tier classification model shown in FIG. 1 consists of a component centralized database 100 and predefined search schema 110. There can only be a single search schema for searching the single database. Each different database instance requires a different schema.

Accordingly, it would be desirable to have a system that allows a user to search different types of databases spread out throughout a company and outside the company and to have flexibility to enter search schema in many different forms based on user preferences.

SUMMARY OF THE INVENTION

Systems and methods consistent with the present invention include a three-tier classification model having multiple search schema mapped to a virtual object hierarchy mapped to databases. An administrator creates the virtual object hierarchy and database search schemas corresponding to the created virtual object hierarchy. Objects in the virtual object hierarchy have associated attributes. These attributes are mapped to columns of the databases and/or user defined functions. The created virtual object hierarchy may have built in functions to change a format of data read from databases. When searches are carried out using search schemas, the system accesses the data stored in the database at the columns in the mapping and performs any of the built-in or user-defined functions.

Preferably, multiple search schemas may link to the same virtual object hierarchy and the same database. Multiple virtual objects may correspond to one search schema. Virtual object hierarchies may be linked to one another thereby potentially linking multiple databases.

In one embodiment of the present invention data in the database is changed as it is read or written from the database using user-defined functions.

The present invention allows for data to be virtually classified, meaning that the virtual object hierarchy provides classifications for data in the databases without actually moving data. The virtual object hierarchy allows the search schemas to be independent of the database.

Additional features and advantages of the present invention will be set forth in the description which follows, and, in part, will be apparent from the description or may be learned by practice of the invention. The advantages of the invention will be realized and attained by the system particularly pointed out in the written description and claims hereof as well as the appended drawings.

BRIEF DESCRIPTION OF THE DRAWINGS

The accompanying drawings, which are incorporated in and constitute a part of this specification illustrate embodiments of the invention and, together with the description, serve to explain the objects, advantages, and principals of the invention:

In the drawings,

FIG. 13 shows an example display screen for refining search criteria for one or more attributes according to the present invention;

DETAILED DESCRIPTION OF THE INVENTION

Figure 1:
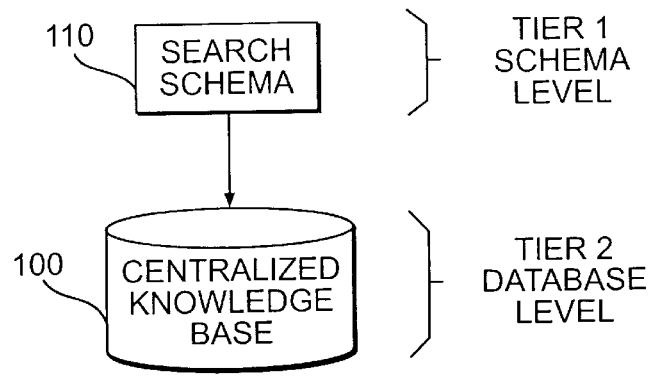
FIG. 1 is an overall system diagram of the two-tier classification model of the prior art.

Reference will now be made in detail to the construction and operation of preferred implementations of the present invention, which are illustrated in the accompanying drawings. In those drawings, like elements and operations are designated with the same reference numerals where possible.

This invention relates to a system for searching for components and other related information that are available and are listed in various databases in a non-standardized format. This system includes a three-tier virtual classification model that uses a virtual object to shield search schemas from rigid database constraints.

Figure 2:
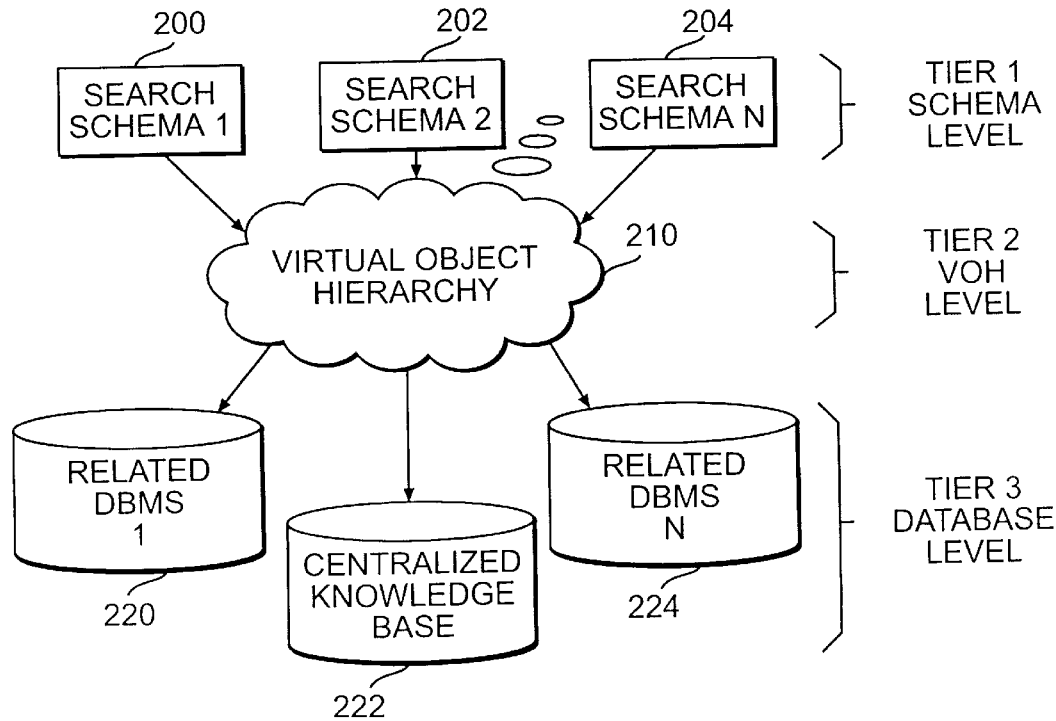
FIG. 2 is a diagram of the three-tier virtual classification model according to the present invention.

FIG. 2 shows one implementation of the three-tier virtual classification model according to the present invention. The three-tier model includes a virtual object hierarchy 210 that acts as an interface between search schemas 200, 202, and 204, and databases 220, 222, and 224. Databases 220 and 224 are, for example, database management systems (DBMS) and database 222 a centralized knowledge base. The virtual object hierarchy 210 allows the search schemas to be independent of the databases. The virtual object hierarchy 210 is a structure representing a hierarchy of virtual objects, where each virtual object corresponds to a category or a collection of categories—such as mechanical parts or electrical parts. A virtual object is an object oriented entity that includes how and where to get the data from databases it is linked to as described below. The hierarchy organizes the objects in ancestor/descendant relationships. The specifics of object-oriented programming are known in the software industry and need not be further outlined here.

Virtual objects as used hereinrefer to a refinement of the object oriented notion of a class complete with encapsulation and inheritance. A virtual object allows an instance of a class and its data to be loosely coupled. An instance of a virtual object's data can originate from one or more databases and/or user-defined functions. The coupling is easily configurable by an administrator as illustrated in figures discussed below such as FIGS. 7, 8, 9, and 16.

The invention allows the presentation and modification of the virtual object's data even if the data resides in a database external to the invention's own database. For example, a virtual object can be configured such that it represents the class of all bolts. The data for all instances of bolts can reside in one or more databases external to the invention.

Figure 3:
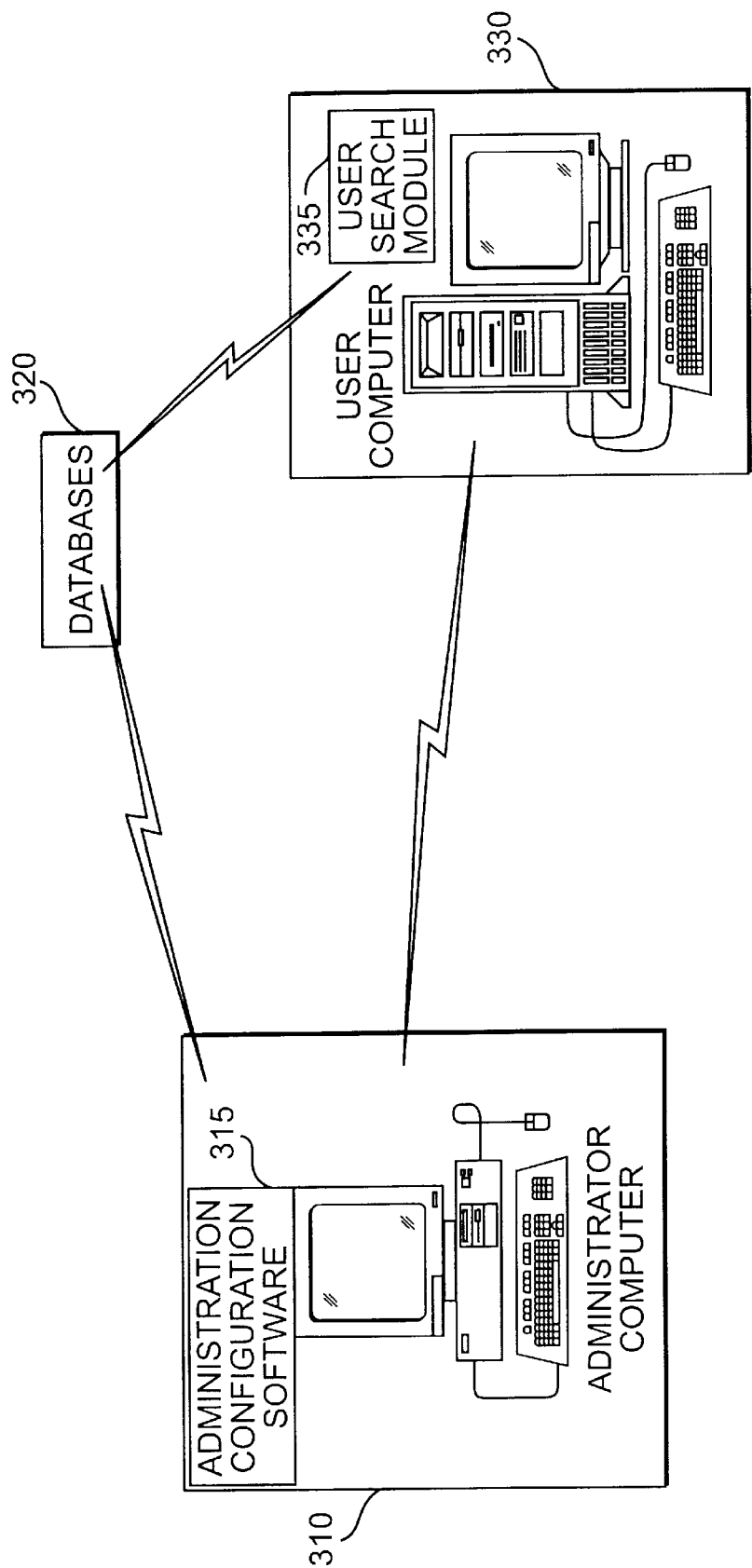
FIG. 3 is an overall system diagram of the structure according to one embodiment of the present invention.

FIG. 3 shows a block diagram of one embodiment of the present invention. As shown, an administrator computer 310 is in communication with user computer 330 and a plurality of databases generally shown as 320. The administrator computer 310 represents the work station of an administrator who sets up the virtual object hierarchy and preferred search schemas using software shown as administrator configuration software 315. The user computer 330 represents the work station of a user that utilizes the virtual object hierarchy and search schemas set up by the administrator to search for existing components or information using software shown as user search module 335. Databases 320 may actually be distributed through a plurality of different sites or in one database. For example, a New York headquarters of a company may have one components database and a research branch in New Jersey may have another components database. There may be additional databases outside of the company as well.

Figure 4:
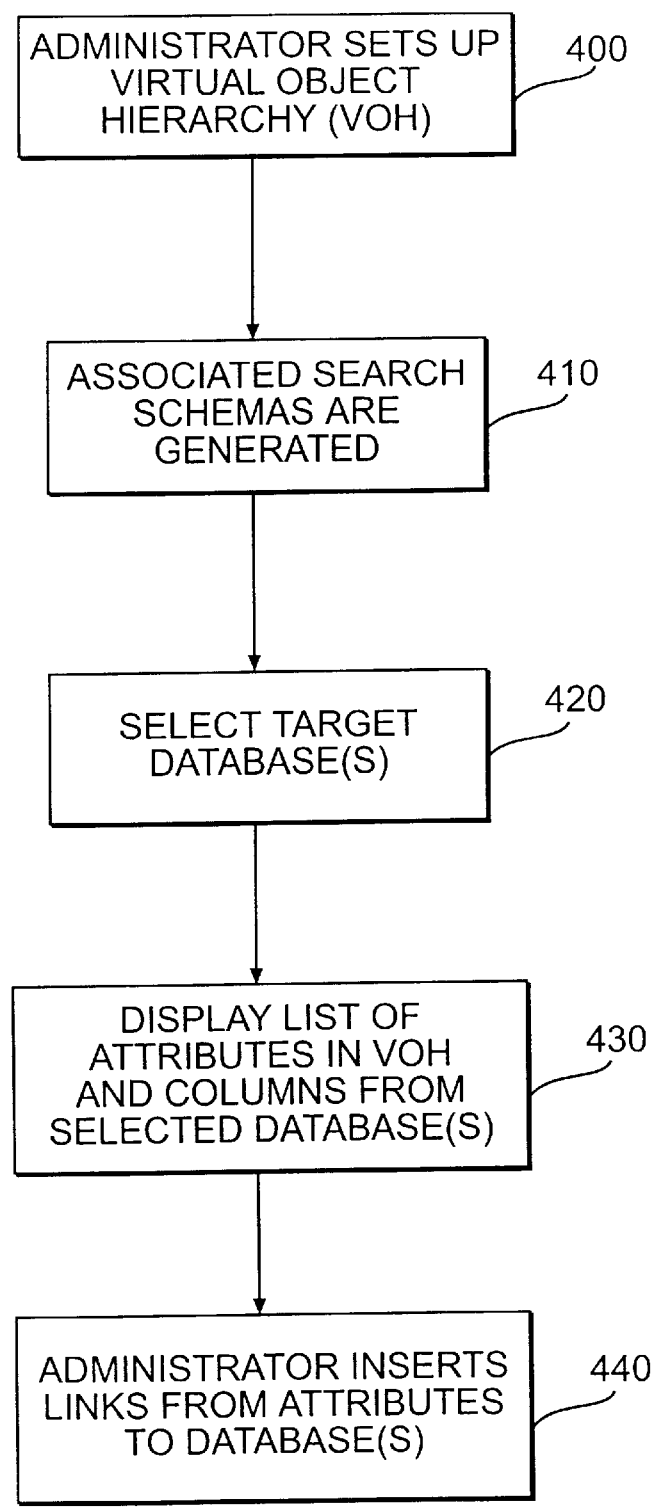
FIG. 4 is a flow chart of the steps an administrator and administrator software carry out to set up the three-tier classification model according to the present invention.

FIG. 4 shows a flowchart outlining the steps an administrator carries out according to one implementation of the present invention. Administrative configuration software 315 prompts the administrator to enter a virtual object hierarchy 210 (step 400). The administrative configuration software 315 includes a virtual object editor with a graphical user interface that allows the administrator to create and edit virtual objects.

Figure 5A:
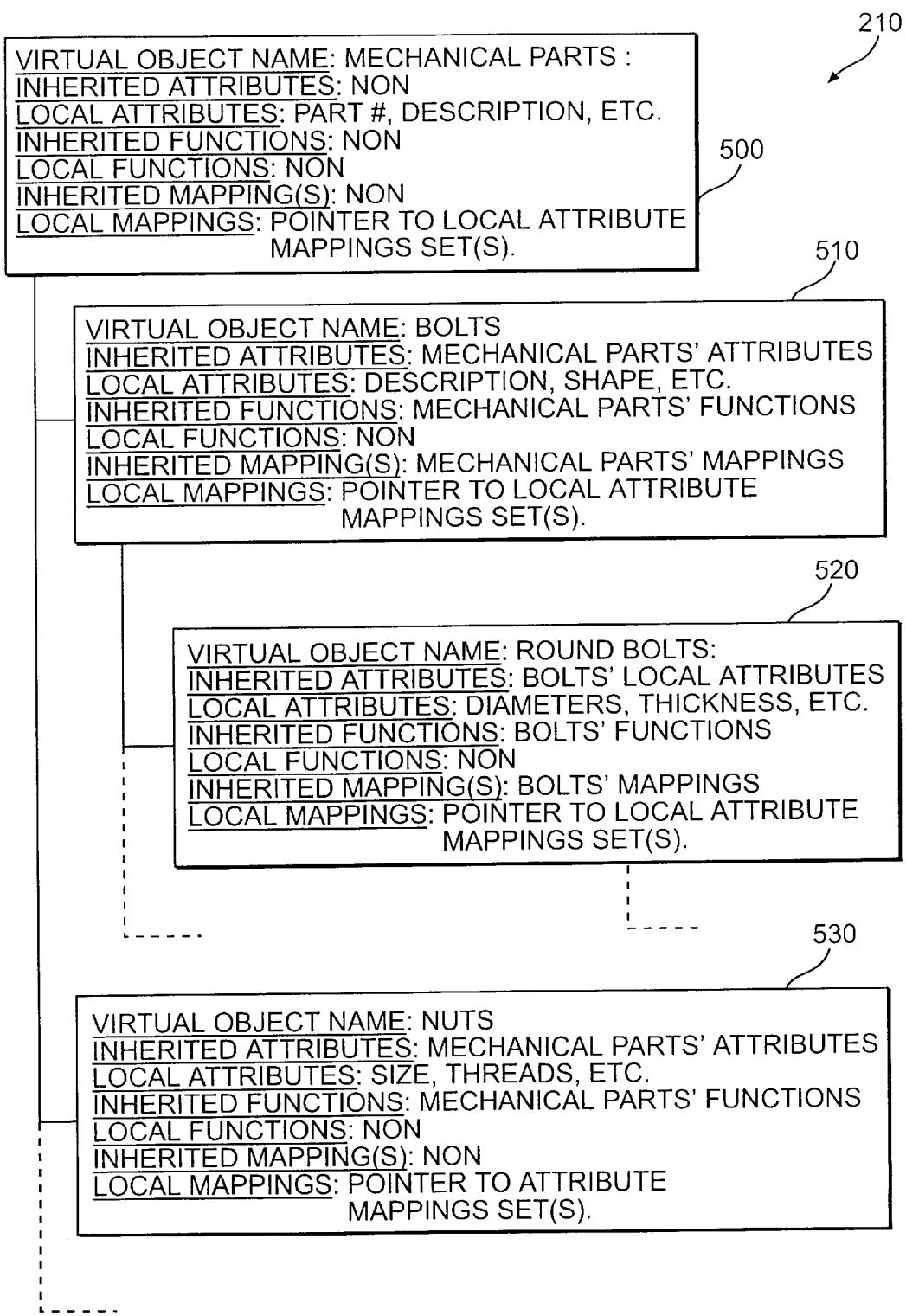
FIG. 5a shows an example virtual object hierarchy.

FIG. 5a shows an example of a virtual object hierarchy 210. The virtual object hierarchy root object 500 shows the type of information that will be in all of the other objects in the hierarchy. Each virtual object in the virtual object hierarchy has its own attributes and mappings describing its relationship to databases and other objects. Parent objects, including the root object, do not inherit attributes from any of its child virtual objects. Children objects inherit the attributes of all parent objects. Virtual object 510 is a child of the root object and introduces the category of bolts. This object 510 inherits any attributes and functions of mechanical parts from its parent objects. The object 510 also includes attributes defined for the object itself such as a description and shape. A child of object 510 is object 520 which is the more specific category of round bolts. Child object 520 inherits all of the attributes of parent bolts object 510 and includes it's own individual local attributes. Nuts object 530 is a child of the root object 500. An object may be an object in more than one virtual object hierarchy thereby tying the two virtual objects hierarchies together.

Figure 5B:
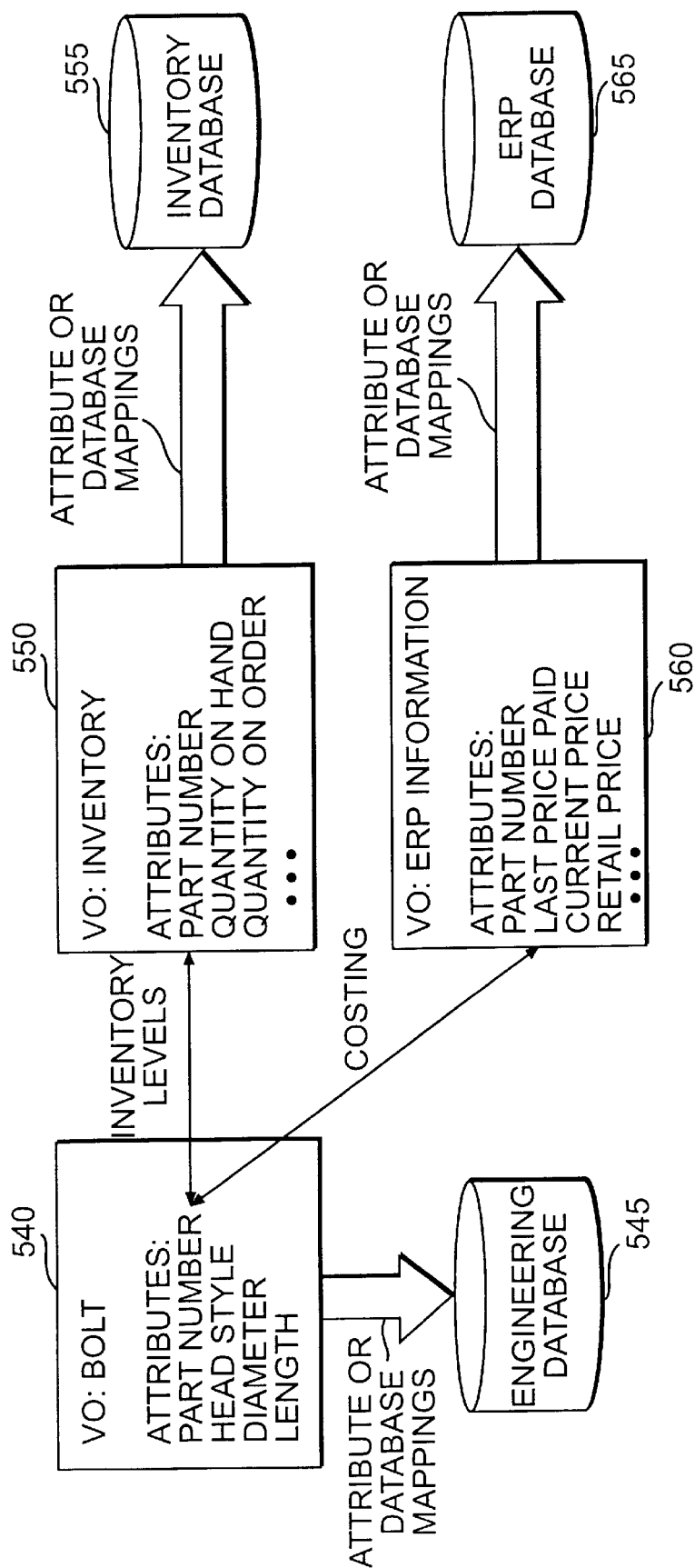
FIG. 5b shows another example of relationships between objects.

FIG. 5b shows another example of the creation of relationships between virtual objects themselves. Administrators can use an input device, such as a mouse to create relationships between different virtual objects (VOs). In the example below, the administrator has created a relationship between the Bolt VO 540, the Inventory VO 550, and the ERP Information VO 560. In this case, the VOs are in completely different VO hierarchies and obtain their data from completely different databases, such as inventory database 545, engineering database 555, and ERP database 565. VO Mappings can have names as illustrated and can be set up to be bidirectional, meaning that the user in this example could navigate from Bolt to Inventory and vice versa.

Figure 6:
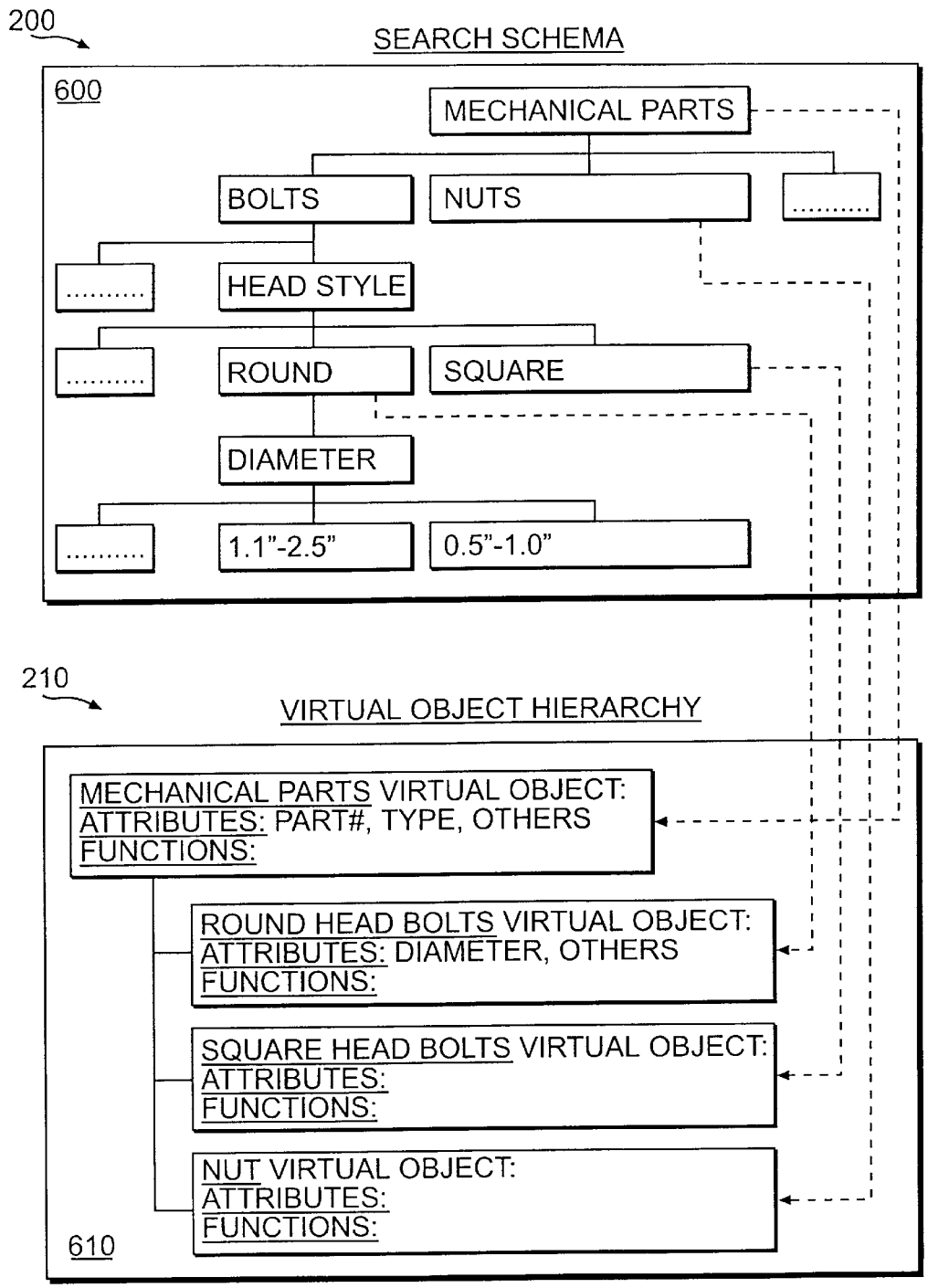
FIG. 6 shows an example relationship between search schema and virtual object hierarchy.

When defining the virtual objects the administrator is setting up elements of potential search schemas 200, 202, and 204 to search for components. A search schema is potentially a subset of the objects defined in an associated virtual object hierarchy and is used by the end user to navigate, classify, search, and retrieve instances of the selected objects in the database(s). As search schema may link to many virtual objects, the search schema can classify and retrieve data from different database management systems. FIG. 6 shows an example single search schema 600 mapped to a virtual object hierarchy 610. As discussed above, an administrator sets up a virtual object hierarchy and multiple search schemas for a group of users. The virtual objects and search schema are typically based on real objects such as bolts. The administrator knows typical types of information this group of users is going to be interested in such as mechanical parts, electrical parts, or suppliers. In combination with the virtual object hierarchy, the administrator may set up several different search schemas for use by a searcher looking for components (step 410). For example, a bolt search schema would include objects such as mechanical parts, bolts, steel, square head. Then when the user accesses this stored schema he may simply add more specifics such as the size of the bolt.

Figure 7:
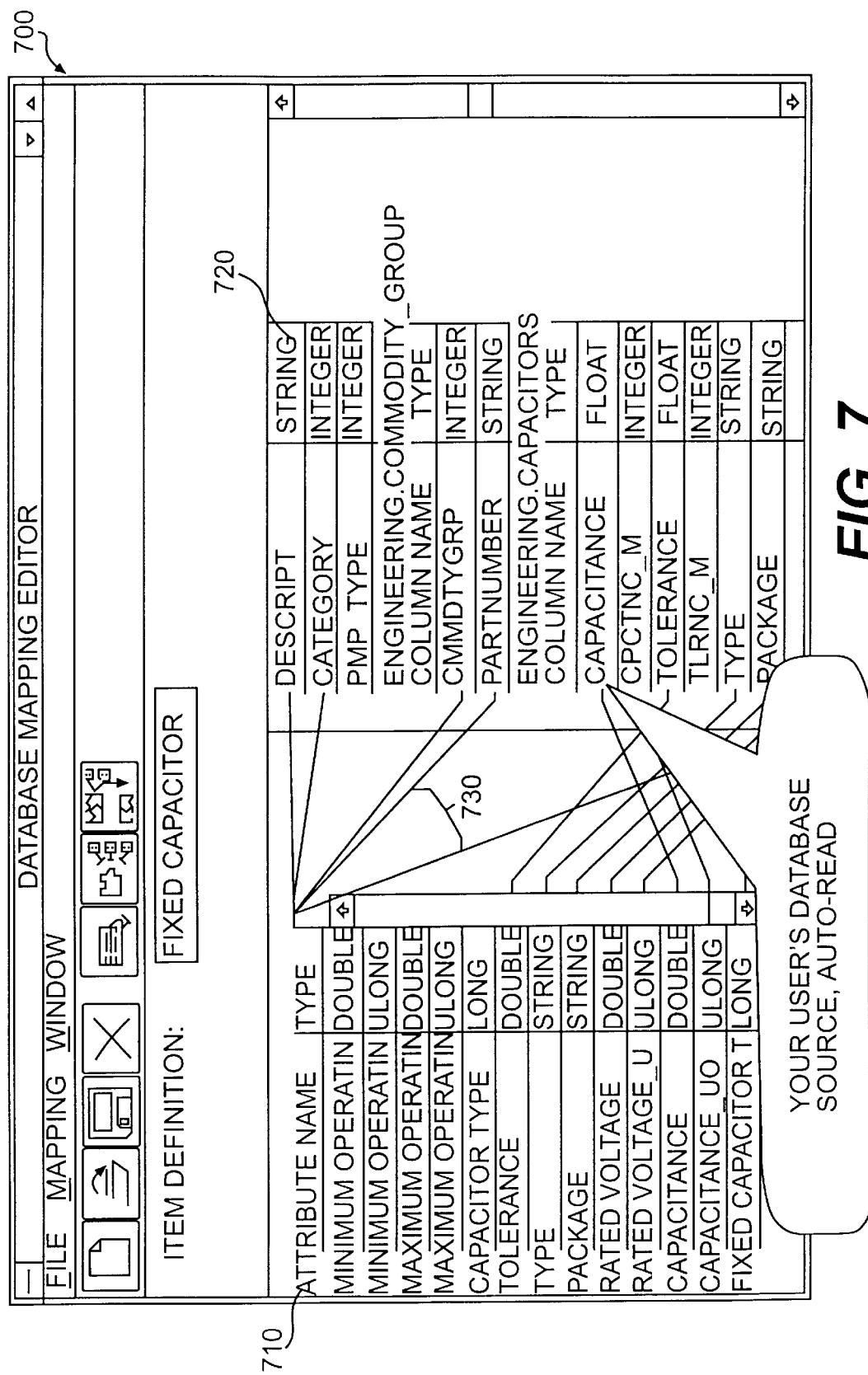
FIG. 7 shows an example display screen mapping object attributes and database columns.

After setting up the virtual object hierarchy and search schemas, the administrator using administrator configuration software 315 maps the virtual objects in the hierarchy to columns in databases. The administrator selects target databases to map the virtual objects (step 420). Preferably, the column information for the target databases was previously downloaded as discussed below with respect to FIG. 10. Administrator configuration software 315 generates display data to display a list of all attributes for a single virtual object at a time along with a list of all selected tables and columns in the target databases (step 430). FIG. 7 shows an example display 700 with a list of attributes 710 for a virtual object and a list of database tables and columns 720. The administrator, using an input device such as a mouse, inserts links 730 between the attribute names 710 in the virtual object hierarchy and the tables and columns 720 in the target databases (step 440). A single attribute in an object may be mapped to a single column of a database. A single attribute may be mapped to multiple columns in one or more databases. Many attributes may map to the same column. And finally, many attributes may map to many columns.

All In another embodiment, the mapping steps 420–440 may precede the schema creation step 410.

Figure 8:
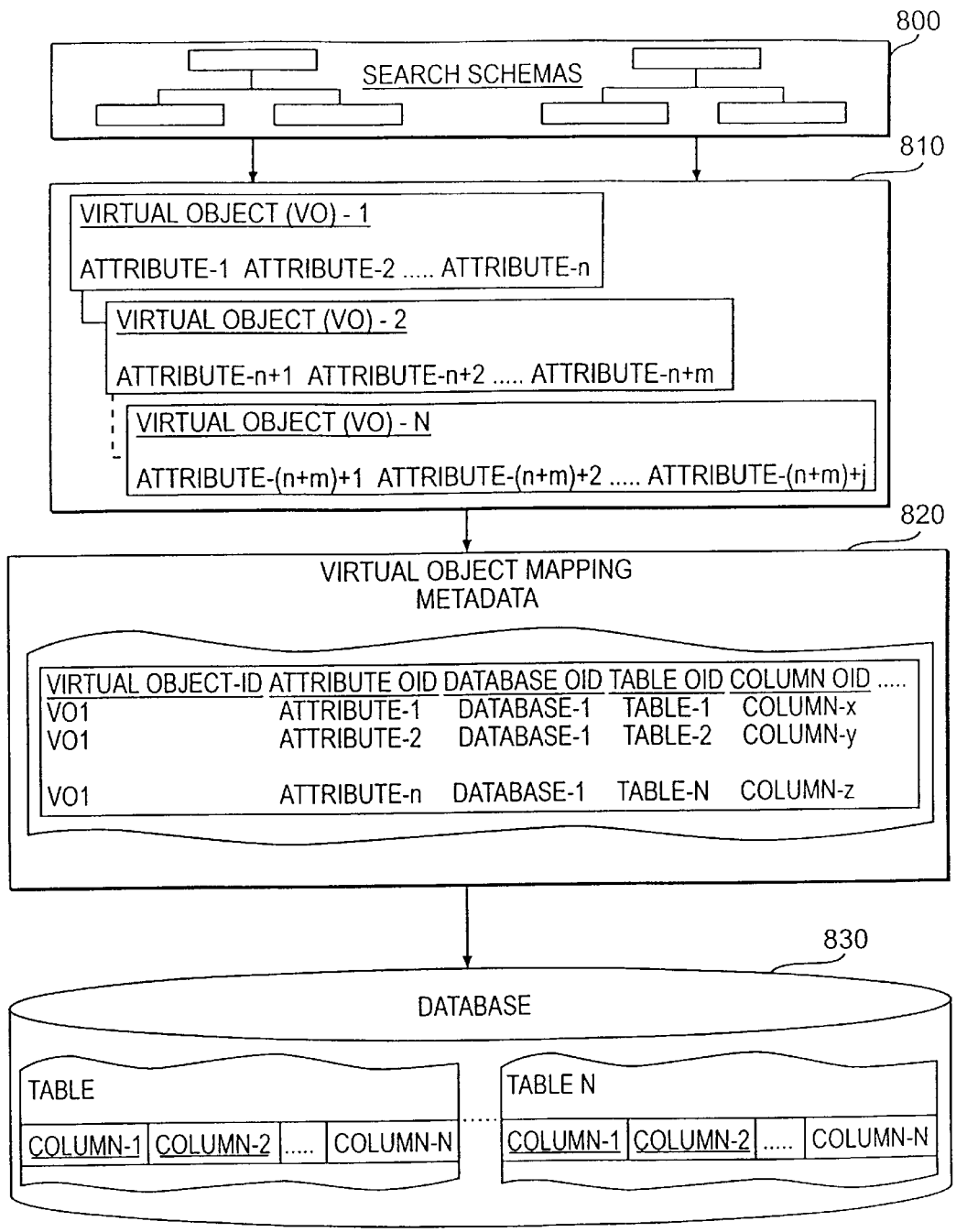
FIG. 8 shows an example overall structure of the three-tier virtual classification model, including the virtual object mapping, according to one embodiment of the present invention.

FIG. 8 shows the overall relationship between the tiers of the present invention. Search schemas 800 are views of the virtual object hierarchy 810 which are mapped as described in FIG. 6 to the virtual objects. The virtual object hierarchy 810 is mapped to one or more databases 830 using mapping 820 which is generated as described in FIG. 7. The mapping in 820 is essentially a set of instructions describing how and from where each attribute of the virtual object will obtain data. The database mappings in 820 may be changed without any impact to the virtual object 810 or to the schemas 800 mapped to the virtual object. This allows for using the same search schemas and virtual object hierarchy with new mappings to different databases. Mapping 820 maps each virtual object to at least one database column in database 830. Database 830 stores the data associated with each column.

Figure 9:
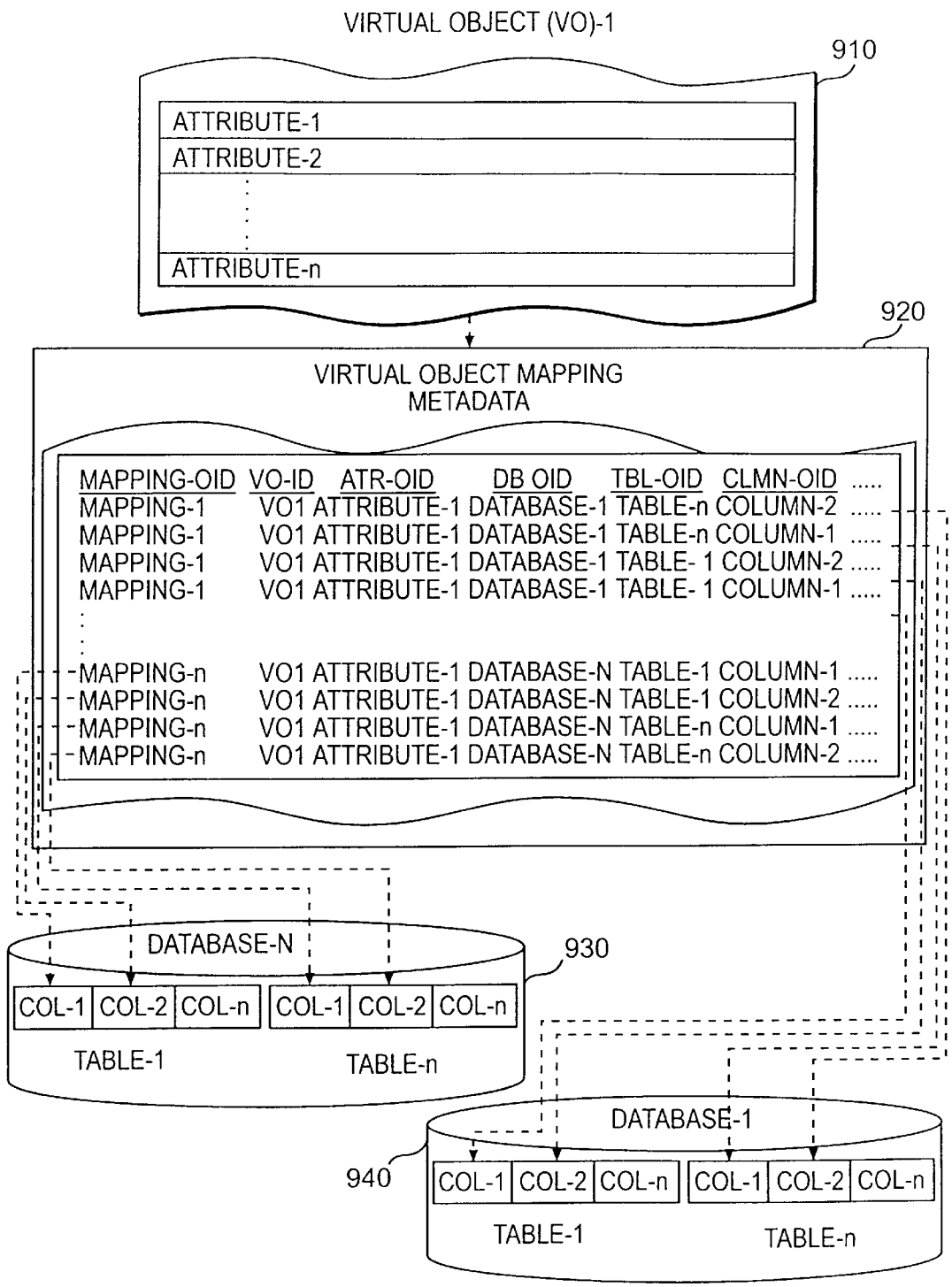
FIG. 9 shows an example object mapping to more than one database.

FIG. 9 shows the overall relationship between the tiers of the present invention when the virtual objects are mapped to a plurality of databases. Virtual object hierarchy 910 was linked to databases 930 and 940 by the administrator as described in FIG. 7. The links are shown as virtual object mapping 920. As shown, an object VO1 may be mapped to a plurality of different columns in a database and to a plurality of different databases.

Figure 10:
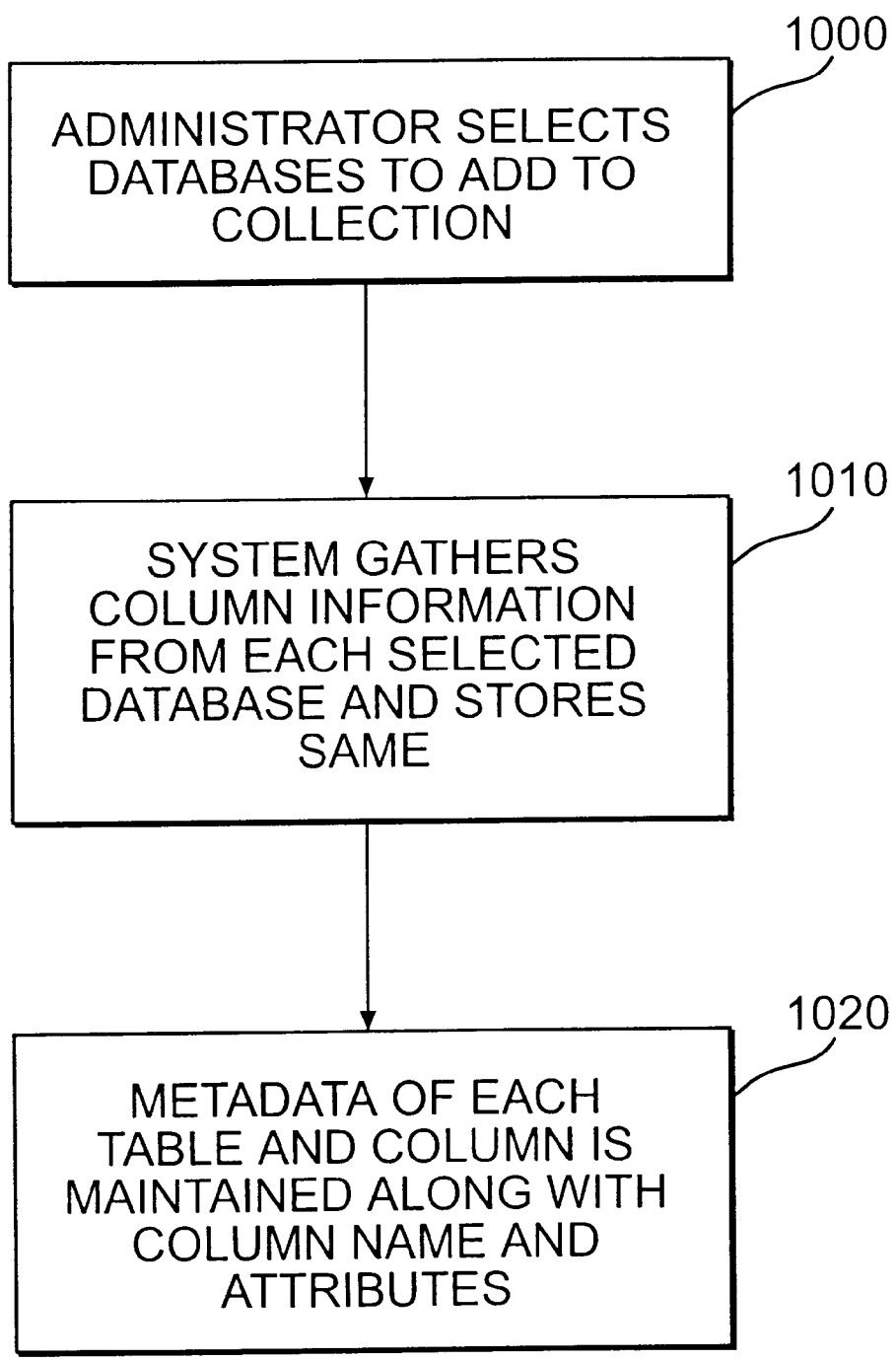
FIG. 10 is a flowchart showing the steps for adding database columns to storage at the administrator site.

In one embodiment, target databases configurations are loaded at one time, preferably before step 420 in FIG. 4, to allow the administrator to freely and automatically load meta data. Meta data is a term of art meaning column information and related information such as type. The meta data is loaded for selected databases in setting up several different mappings to virtual object hierarchies. As shown in FIG. 10, the administrator selects databases to add to its collection of target databases (step 1000). Administrator configuration software 315 gathers the column information from each selected database and stores the same using known database techniques (step 1010). It is important to note that the system does not gather the data from the databases but only the metadata, such as tables and columns. Each table and column has metadata indicating which database it belongs to. The metadata of each table and column is maintained in storage at administrator computer 320 along with a column name and attributes (step 1020).

Figure 11:
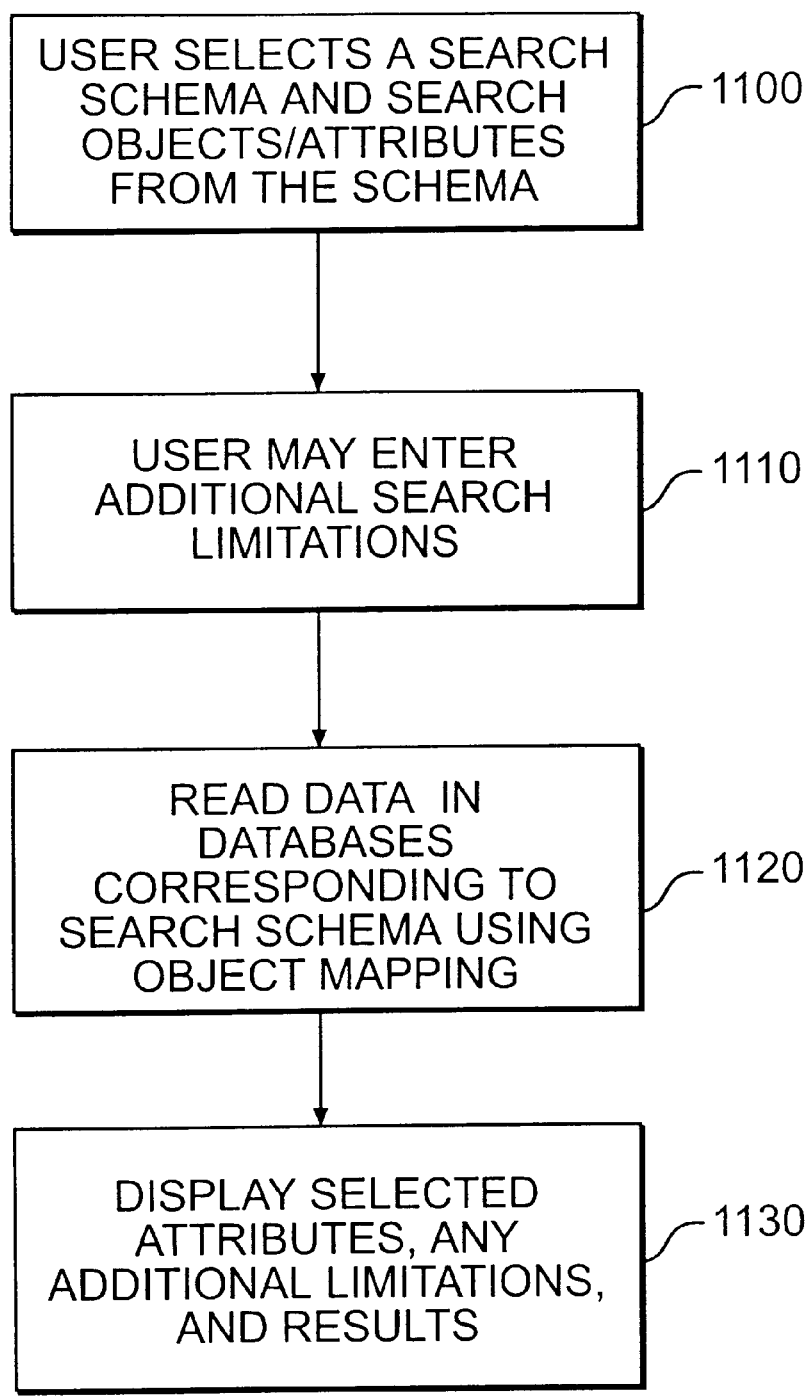
FIG. 11 is a flowchart showing the steps a user performs to search for components according to the present invention.
Figure 12:
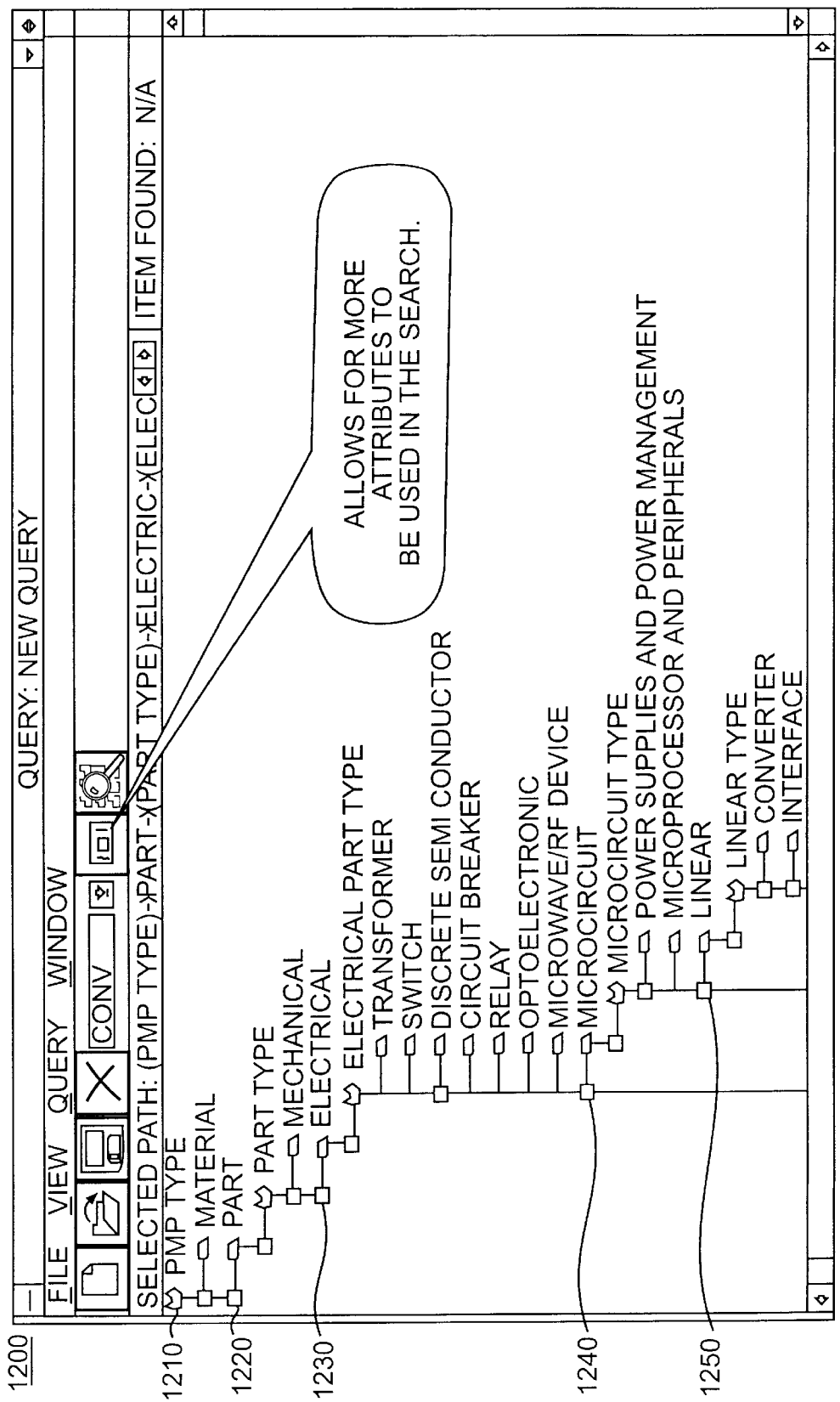
FIG. 12 shows an example display screen for selecting a type of virtual object to query for and establishing values for attributes that appear in the search schema.

Once the administrator setup of the virtual object hierarchy, search schemas, and mapping is complete, the user at user computer 330 may conduct searches with the user search module 335. The user uses search schemas generated by the administrator. FIG. 11 is a flow chart of the steps the user and user search module 335 take to perform a search. User search module 335 generates display data to display a tree of objects to a user for selection (step 1100). FIG. 12 shows an example display 1200 of a search schema with a tree of selected object data. This screen allows a user to select a type of virtual object to query for and values for attributes that appear in search schema. In this example, the user selected PMP Type 1210. The user was then presented with the choice of "material" or "part." The user selected part 1220 using an input device, such as a mouse. Once again, the user was presented several selections from which he could choose including mechanical or electrical. The user selected electrical 1230. Again the user was presented with a list of options including transformer, switch, discreet semiconductor, circuit breaker, relay optoelectronic, microwave/RF device, and microcircuit. The user selected microcircuit 1240. The user was again presented with options from which he selected linear 1250. This series of selection is the search schema which is mapped to the virtual object hierarchy as discussed above.

Figure 13:
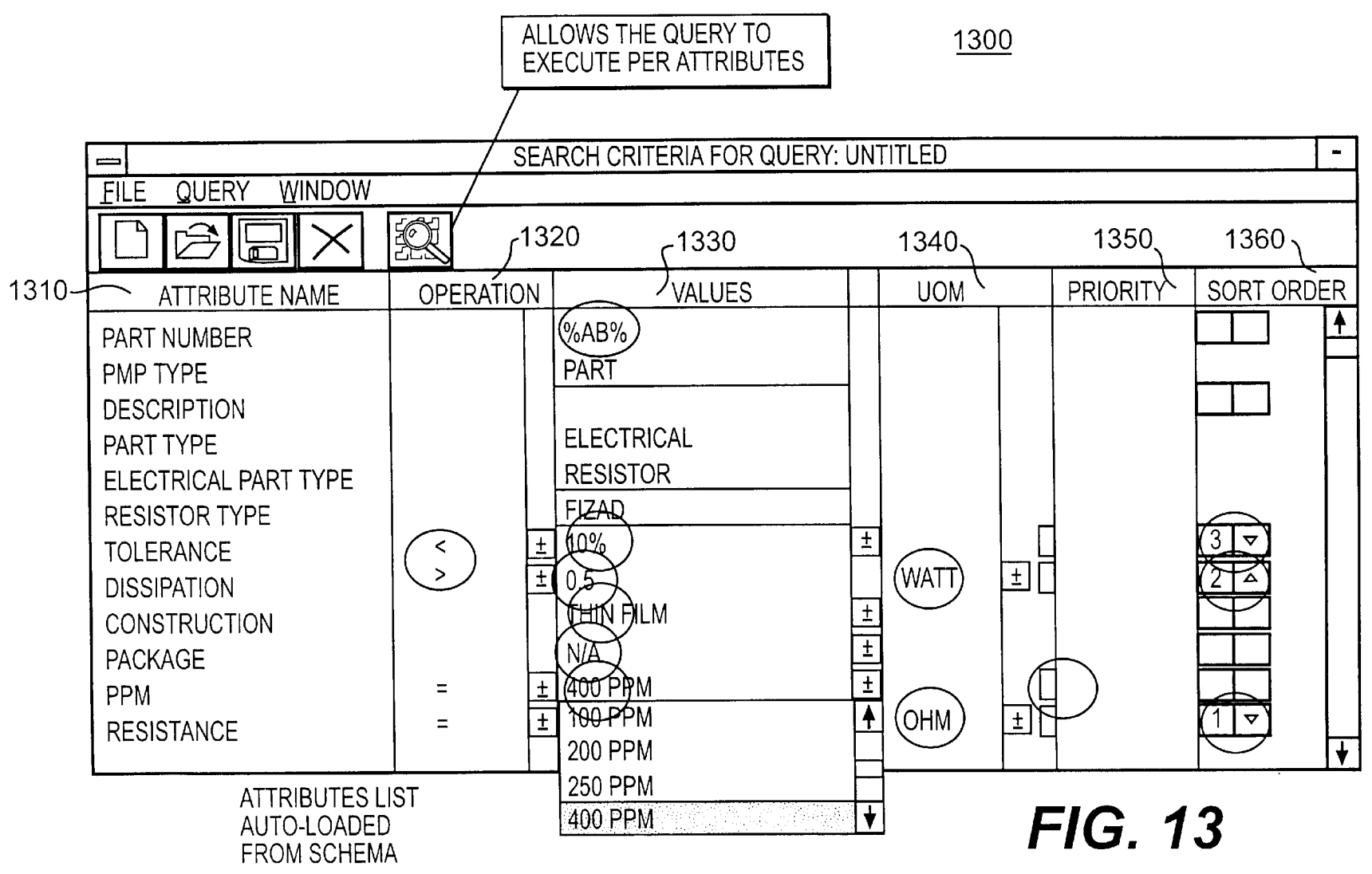

The user may select additional search limitations (step 1110) as shown in FIG. 13 to narrow the results. Display 1300 is automatically and dynamically generated by the user search module 335 and is relative to the search path in the schema. The user may select additional search criteria such as specific values 1330 for attributes 1310. Operation field 1320 allows the user to designate a relationship between the attribute and a value in the value field. The unit of measurement (UOM) column 1340 allows the user to select the unit of measurement such as ohms. The priority field 1350 allows a user to relax constraints for a particular field as is known in the art. The sort order field 1360 allows the user to designate the order that results should be displayed, such as by year. In designating search terms or values the user may use wild cards as are commonly used in search engines. For example, if only a portion of a part number is known, that portion may be entered along with a symbol designating a wild card, and all parts with that portion of the part number will be the found.

Figure 14:
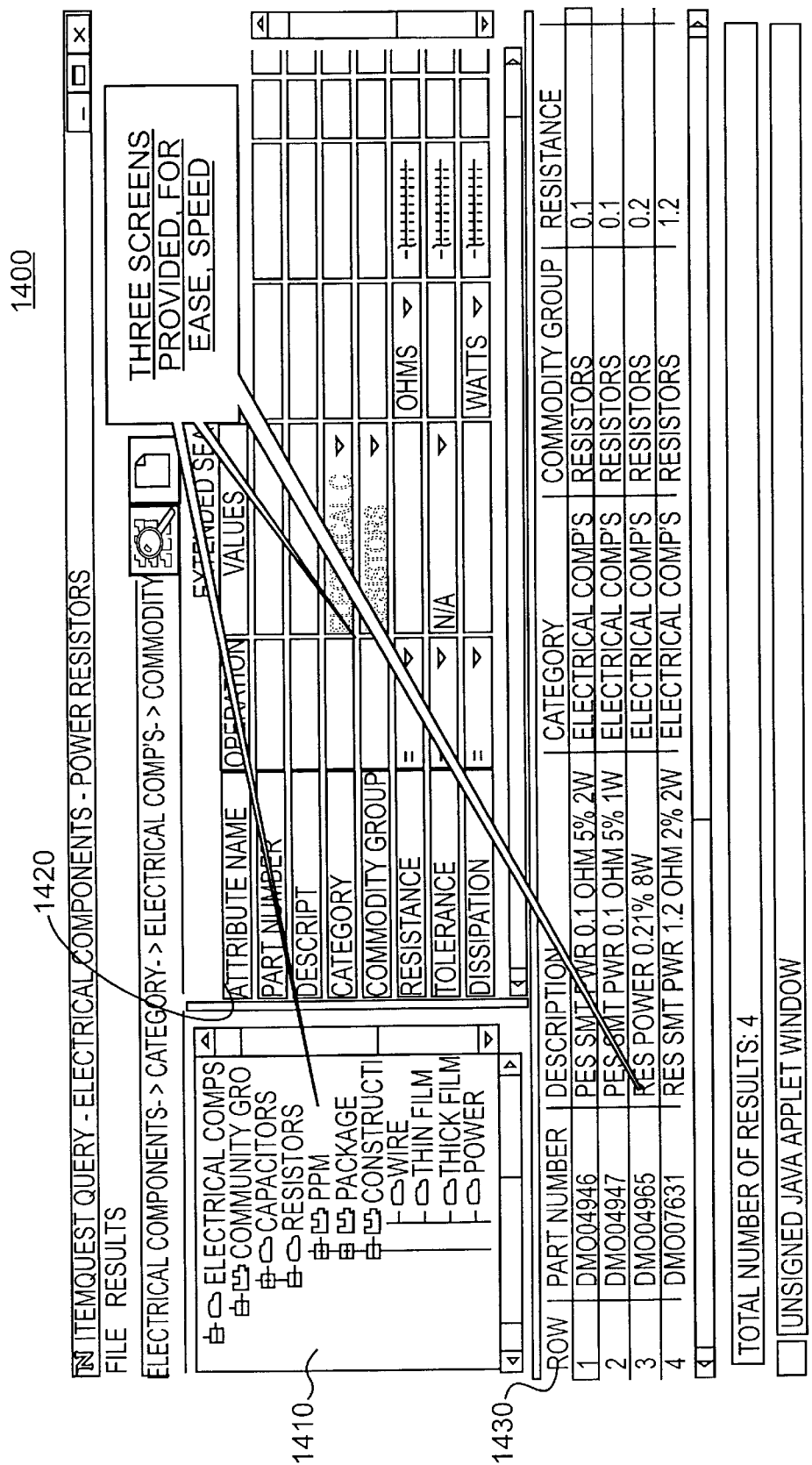
FIG. 14 shows an example display screen showing the selected search attributes, additional constraints, and results of the search.

Once the search schemas and specific search values are selected, the virtual objects corresponding to each search element are used to access the column in a database that may have data on the search item. The data is read from the databases for each attribute using the mapping (step 1120). In one embodiment a single display 1400 is produced (step 1130) as shown in FIG. 14 that includes the attributes selected 1410, any additional limitations 1420 and the resulting data found in the databases 1430.

Figure 15:
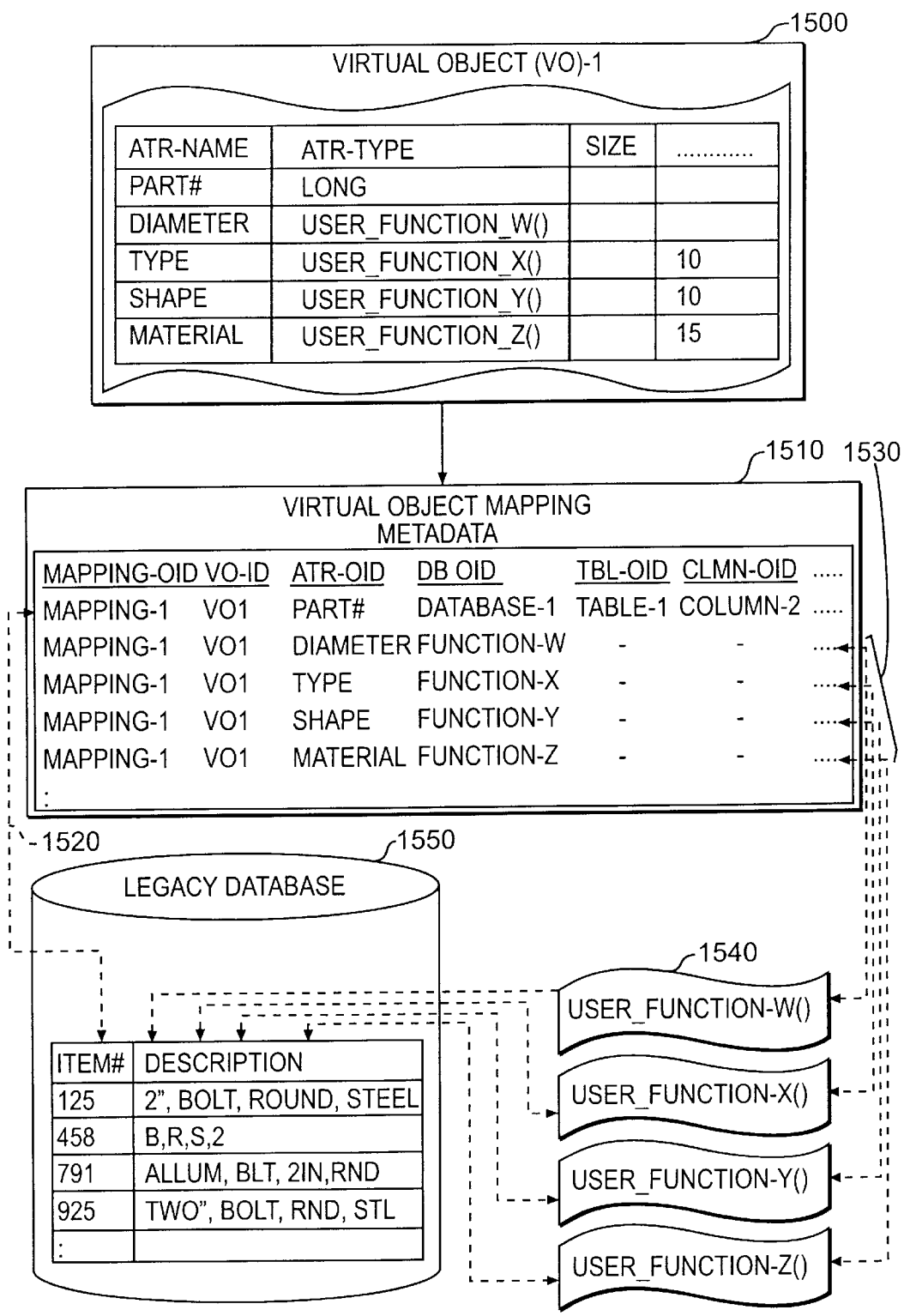
FIG. 15 shows virtual objects mapped to user functions according to another implementation of the present invention.

In an alternative embodiment of the present invention, attributes of the virtual object hierarchy are not just linked to a column of a database. As shown in FIG. 15, virtual objects 1500 may be mapped 1510 to a column as shown as link 1520 or to a user function as shown as links 1530. As discussed above, the virtual objects when set up by the administrator may include defined functions to act on data when retrieved from the databases. Similarly, user functions 1540 are functions that are invoked at the time of the execution of a search. User functions may be created by a user, and administrator, or the software provider. The user-defined functions may search for and change data in the database 1550. The user-defined functions may perform different tasks such as performing a calculation on data or dynamically cleansing data. Cleansing data in general is known in the art as putting the data in a more uniform format. For example, the user-defined functions may change all distance measurement values to the same unit of measurement or may change all abbreviations to the complete word. The present invention allows for virtual cleansing meaning that the user functions 1540 cleanse the data and present it to user search module 335. The actual physical correction of the data in the database 1550 is not necessary.

Figure 16:
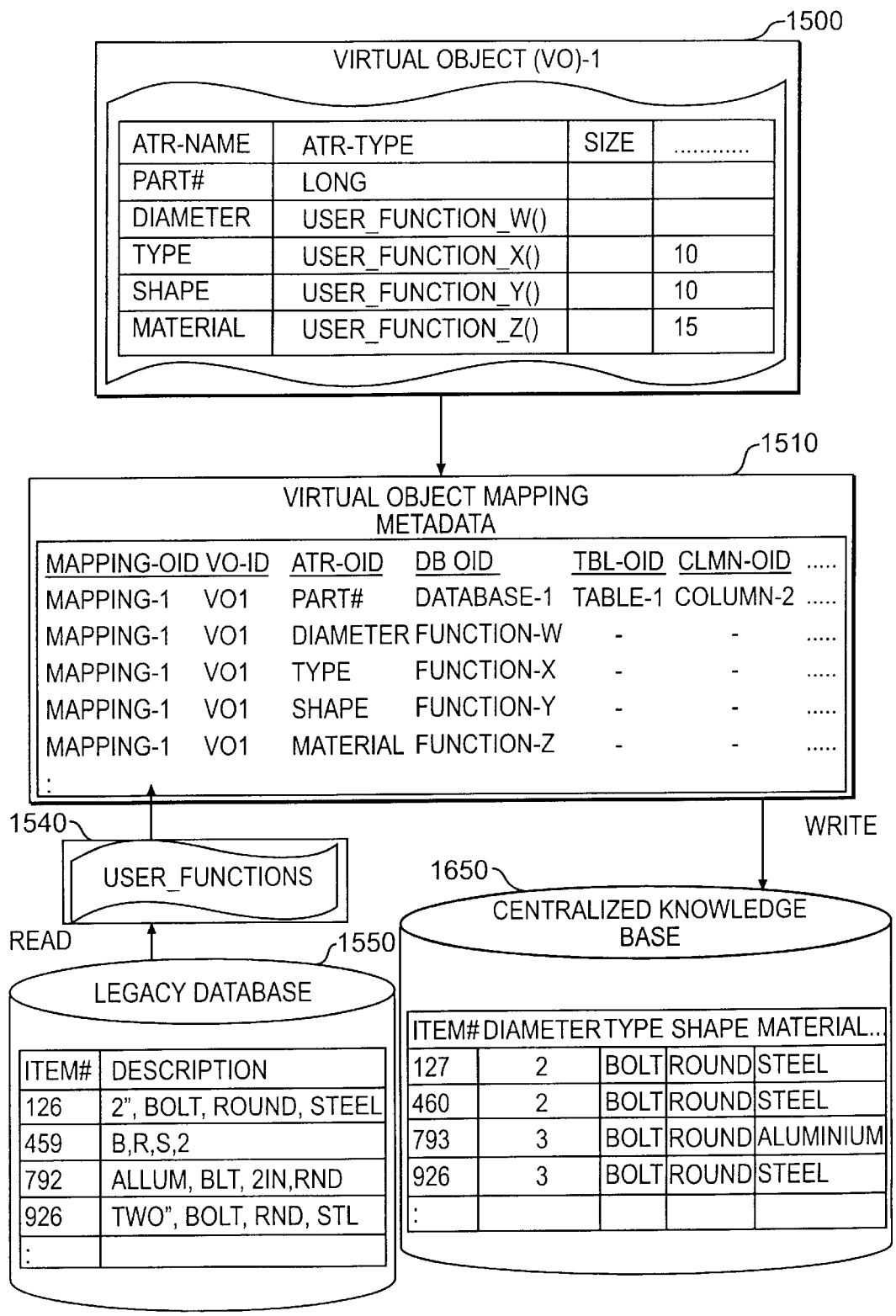
FIG. 16 shows a user function for cleansing data before storage according to another embodiment of the present invention.

FIG. 16 shows an example of performing physical cleansing using the present invention as shown in FIG. 15. In this embodiment the user cleansing function 1540 is performed on all data as it is read from the legacy database 1550. The cleansed data is then stored in centralized knowledge base 1650. Centralized knowledge base 1650 thereby has a physical copy of all of the cleansed data from legacy database 1550.

The three-tier virtual classification model of the present invention allows for finding components from a plurality of databases using multiple flexible search schemas. A company may easily find existing components for reuse shortening time to market, increasing profitability, and reducing development and manufacturing costs. A search schema is based on virtual objects in a hierarchy mapped to databases. By accessing the databases the data corresponding to the search schema may be retrieved and displayed to a user. The present invention may also be used to cleanse data in a database either virtually or physically.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to permit one skilled in the art to utilize the invention and various embodiments and with various modifications as are suited to a particular use contemplated. It is intended that the scope of the invention be defined by the claims appended hereto and their equivalents.

What is claimed is:

1. An information classification and retrieval system including:

means for creating a virtual object hierarchy, each virtual object in the hierarchy having means for creating search schemas;

means for mapping at least some of the virtual objects in the virtual object hierarchy to database columns in a database, wherein the means for mapping includes:

means for selecting a target database;

means for obtaining column identifiers from the selected target database;

means for displaying the column identifiers and the attributes from the virtual objects;

means for linking the column identifiers and the attributes; and means for storing a map based on the linked column identifiers and the attributes, means for searching the database using at least one of the search schemas; means for selecting search schemas using the virtual object hierarchy; and means for adding additional search limitations to the search schemas.

2. A method of classifying and retrieving information including the steps of:

creating a virtual object hierarchy, each virtual object in the hierarchy having attributes;

creating search schemas;

mapping at least some of the virtual objects in the virtual object hierarchy to database columns in a database, wherein the step of mapping includes the steps of:

selecting a target database;

obtaining column identifiers from the selected target database;

displaying the column identifiers and the attributes from the virtual objects;

linking the column identifiers and the attributes; and storing a map based on the linked column identifiers and the attributes, searching the database using at least one of the search schemas; selecting search schemas using the virtual object hierarchy; and adding additional search limitations to the search schemas.

* * * * *

UNITED STATES PATENT AND TRADEMARK OFFICE
CERTIFICATE OF CORRECTION

PATENT NO.     : 6,199,059 B1                                                            Page 1 of 1
DATED          : March 6, 2001
INVENTOR(S)    : Haim E. Dahan et al.

It is certified that error appears in the above-identified patent and that said Letters Patent is hereby corrected as shown below:

<u>Column 8,</u>
Line 2, after "having" insert, -- attributes; --.

Signed and Sealed this

Sixteenth Day of July, 2002

Attest:

JAMES E. ROGAN
Attesting Officer     Director of the United States Patent and Trademark Office